United States Patent [19]

Alfio

[11] 4,218,419
[45] Aug. 19, 1980

[54] EXTRACTING CORE FROM HOSE

[75] Inventor: Deregibus Alfio, Padua, Italy

[73] Assignee: The Goodyear Tire & Rubber Company, Akron, Ohio

[21] Appl. No.: 14,003

[22] Filed: Feb. 21, 1979

Related U.S. Application Data

[62] Division of Ser. No. 841,789, Oct. 13, 1977, Pat. No. 4,157,886.

[51] Int. Cl.² .............................................. B29C 7/00
[52] U.S. Cl. ..................................... 264/334; 425/438
[58] Field of Search ................. 425/436, 438; 299/63; 264/334

[56] References Cited

U.S. PATENT DOCUMENTS 3,946,483   3/1976   Holden et al. ............... 425/436 R X

*Primary Examiner*—J. Howard Flint, Jr.
*Attorney, Agent, or Firm*—William A. Drucker

[57] ABSTRACT

A method for axially extracting a rubber hose of great length from the correspondingly long core about which the article has been formed and vulcanized, comprising the steps of positioning the article having its core therein on a correspondingly long longitudinally displaceable support having an upper surface adapted for frictionally engaging the hose, securing one end portion of the core, external to the hose, in a stationary location, and longitudinally displacing the support for spacing the same from said location, whereby a pull is exerted at all points along the hose for causing the core to be extracted from the hose.

14 Claims, 4 Drawing Figures

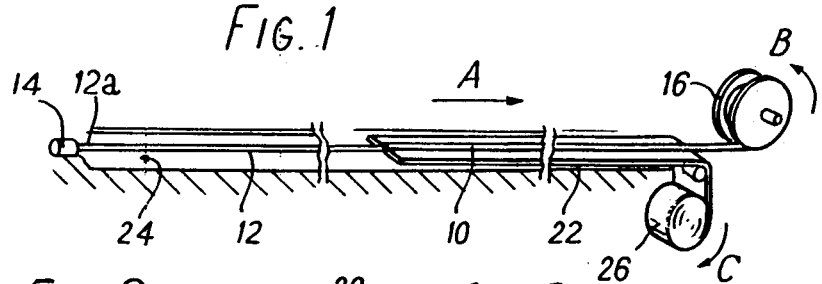
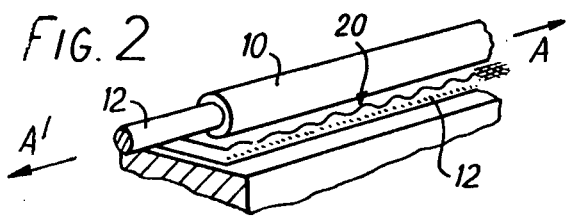
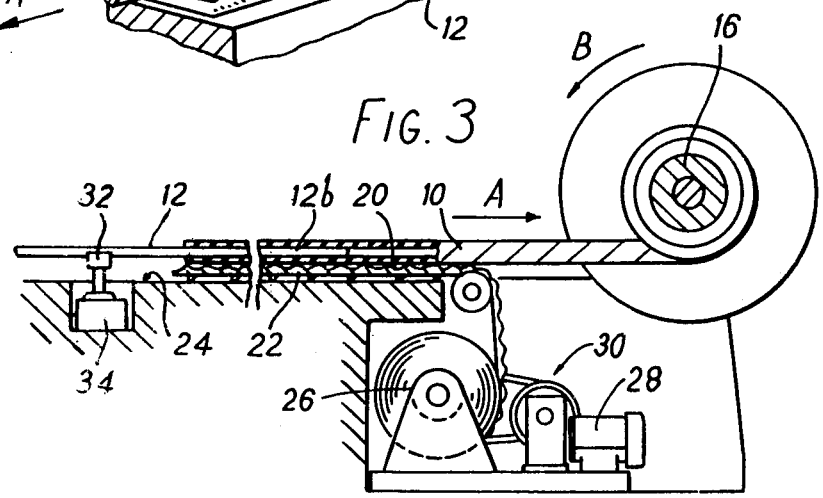
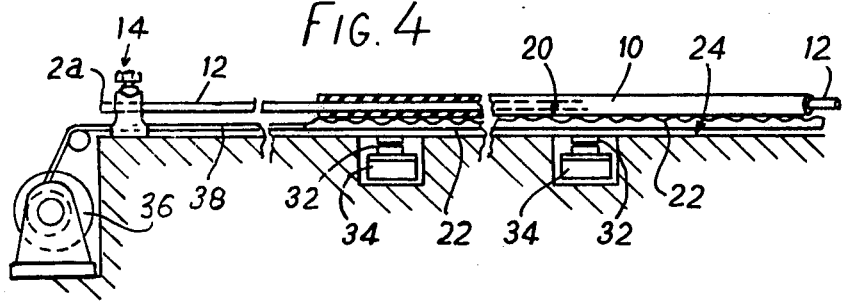

EXTRACTING CORE FROM HOSE

This is a Division, of application Ser. No. 841,789 filed Oct. 13, 1977 now U.S. Pat. No. 4,157,886.

BACKGROUND OF THE INVENTION

1. Field of the Invention

This invention concerns a method for carrying-out the operation of separation of a tubular article of great length, in particular of a piece of rubber hose, whether or not reinforced, from the core or elongated body, in general metallic, around which the article is previously manufactured by helical winding of a number of layers or tapes of raw rubber, possibly partly reinforced with a textile structure, and then treated so as to obtain the vulcanization of the rubber or the elastomeric material forming the main constituent of the hose.

2. Description of the Prior Art

It is known in the art to which this invention appertains, that the extraction of a metallic core, of uniform diameter, from a tubular article preformed and treated (in particular vulcanized) around the said core, gives rise to considerable problems and difficulties, despite the predisposition of a suitable detaching agent on the surface of the said core, difficulties which become more serious and finally almost insuperable, with the increase in the length of the core and thus of the article. It must in fact be remembered that an article of this kind, of an essentially resilient nature, tends to contract when it is subjected to tension stresses, which prevent its movement. In fact, it is not possible, with this kind of article, to extract the core from the article (or vice versa) by simply exerting traction in contrary directions on one extremity of the article and on the opposite extremity of the core.

In practice, according to the present technique, it is necessary to carry out all the operations and handling excusively by hand. A necessarily considerable number of operators must grasp the outside of the article, at a corresponding number of strictly spaced intervals and, acting synchronously, they move the tubular article, in an axial direction, in such a way as to make it slide uniformly at every point of its length around the core. An operation of this kind, other than obviously requiring the availability of numerous personnel and taking a considerable length of time (generally proportional to the length of the article), is obviously not feasible when this length exceeds determined limits.

SUMMARY OF THE INVENTION

This having been stated, the subject of this invention is a method for the mechanical carrying out of these operations, and in conditions such as to practically exclude any limit in length of the article and core to be mutually extracted.

Essentially, according to the invention, the method consists in placing the article, enclosing the relative core, on to a transporting plane (single or subdivided into a succession of parts) generally horizontal and of corresponding length, supported in a moveable way, relatively to the core of the article in a direction parallel to the axis of the article itself, and to make the said plane move in a uniform way along its entire length, whilst the core is restrained at its extremity opposite to the moving direction of the transporting plane.

Means for carrying out the said method may comprise the transporting plane consisting of a conveyor carpet, unitary or sectioned, inextensible longitudinally, whose upper surface is preferably of elastomeric material and/or including notches and/or reliefs very close to each other or in any case unevenness such as to assure good adherence with the article placed on it, and means to make the said carpet move in a uniform way at every point along its length, so as to consequently make the article move in a corresponding way, at every point, whilst the core is held in such a way that it cannot follow the said movement.

The separation means may include support means for the said core, adapted to sequentially intervene as the said core is uncovered by the tubular article in the course of extraction, at sufficiently short intervals to prevent the said core from lowering and/or deflecting and thus weighing down upon the tubular material, in the proximity of the point at which it is freed from the core.

The said conveying carpet may be connected, at its extremity opposite to that which is connected to the means to make it move, to other means which make it move in the opposite way, to make it return to the initial position, in preparation for a successive work cycle.

Preferably, the means which make the said carpet move in the required way, are made up of winches or windlasses.

These and other more specific characteristics of the invention together with the effects which result, will appear more evident in the course of the following detailed description of an example with reference to the drawings;

BRIEF DESCRIPTION OF THE DRAWINGS

FIG. 1 is a schematic perspective view illustrating the method of the invention;

FIG. 2 is a fragmentary perspective view on a larger scale, of a detail of the conveyor carpet;

FIG. 3 is a partial side elevation and partial cross-section of means for moving the conveyor carpet and means for winding up the hose;

FIG. 4 is an elevation of the other end portion of the core and hose.

DESCRIPTION OF THE PREFERRED EMBODIMENT

With particular reference to the figures of the drawing: in its entirety, and as schematically shown in FIG. 1, this method, in order to free the tubular article 10 of the type considered, from the core 12, generally metallic, with full or tubular section, and in any case rigid, traction is exerted on the said article in a determined direction, for example in the direction indicated as A, whilst the core 12, is restrained from this traction, for example by fixing its extremity 12a (which is allowed to protrude from the article, during its manufacture) to a suitable fixing device 14. The article 10, as it is freed from the core 12 (in FIG. 3 the opposite extremity, shown as 12b, of the said core is illustrated) is collected for example, by winding it around a bobbin 16, set in rotation in the direction B.

However much it is advantageous, if not for other than the convenience of space, to make the said article move in the direction A with respect to the core 12, which is kept stationary, the possibility of adopting an inverse procedure is not excluded, moving the core 12 in the direction A, whilst a resistance to this movement (which results in the said direction A) is applied to the article, all as shown in FIG. 2.

However, the essential characteristic of the invention is that this movement (or resistance) of the article, which obviously must be kept straight, initially along its entire length and successively on all its parts still occupied by the core 12, is applied by acting substantially on every point of its said length, in such way that the article is not subjected to axial tensions, which could give rise to deformities, even localized, in a transversal or radial direction.

In order to obtain such a result, the article, originally containing the respective core, is placed on the upper surface 20 of a material, generally tape-like, illustrated by the tape 22, a surface which is such as to offer a high resistance to friction. Preferably, this surface 20 is made up of rubber or other elastomeric material, possessing a high friction coefficient. This surface can be transversally undulated (as shown in the figures) or indented, or containing a number of small, very close reliefs, in order to obtain small deformities or local deflections which encourage good adherence. This surface 20 could also possess longitudinal grooves, and/or the tape 22 could be bent in a transversal sense, for example, by means, of localization of roller or sliding supports, on the edges of the lower face of the tape, in order to increase the surface in contact with the article.

Another important condition is that this tape, if subjected to a movement in direction A, according to the preferred method of carrying out the invention, moves in an identical way along its entire length. Therefore, the transporting and moving tape 22 must be non-extensible, for example by including, within its thickness, a tensile resisting reinforcement, for example a fibrous structure and, preferably, incorporating threads or thin and narrow metallic tapes.

As represented in FIGS. 1 and 3, the tape 22 is at least as long as the article, and it is carried along a horizontal support plane 24, in a sliding manner, for example with the use of rollers, lubricating materials or the like, and is coupled at its extremity, opposite the restraining point 14 of the core 12, to a traction system, for example to a winch 26, onto which it is wound, and which is set in rotation for example by means of a motor 28 and a transmission system 30, including preferably a variator, in order to obtain adaption of the moving speed to the various requirements and conditions of service.

Furthermore, in order to sustain the core 12 of the article, as this becomes uncovered following the advancement of the article, there may be provided support means 32 raisable for example by jacks 34 which are activated in sequence, or such as to become present under the said core, even with different movements, for example transversal, so as to prevent the core from weighing down locally on the article, more precisely on its terminal part.

At the end of every extraction operation, the tape 22 can be recuperated and put back into its initial position, for example by means of a recuperating windlass 36 which rewinds a cable or stay wire 38 (FIG. 4) coupled at the extremity of the tape, opposite to that connected to the windlass 26.

The device described above and represented in the drawings, is a not limitative example for the carrying out of the method which, could also be carried out by adopting numerous different constructive and technical solutions. For example, along the length of the article two or more tapes connected in sequence could be arranged, attaching each one to a pulling winch and to a recuperating winch, and operating in synchronism, at least for the stretches on which the article progressively advancing in direction A is still present.

The carrying and pulling surface 20 could be made up of the upper horizontal branch of a carpet or conveyor track, operating in a closed circuit. This technical solution allows the elimination of necessarily returning to the initial position. Similarly, the length of this surface could be split into a number of conveying carpets, operated in such a way as to assume and keep equal linear speeds.

Similarly, equivalent results and actions could be obtained, in conformity with that described with reference to FIG. 2, by placing the article 10 on an adhering surface 20, which surface is stationary, whilst the core 12 can be entirely moved in the direction A', for example by coupling the extremity to a trolley advancing for example on rails along a path parallel to the prolongation of the axis of the article, for a distance at least equal to the length of the article itself.

Furthermore, the device, operated by applying the above-described technical solutions and other equivalent, could be integrated with complementary means adapted to favour the detachment and the relative movement between core and article. In addition to the preventive application (and that is before the manufacturing of the tubular article) of lubricating substances or of detaching agents adapted to reduce adherence between the internal surface of the article and that of the core around which it has been manufactured, this adherence could be reduced and the detachment could be made easier for example by introducing compressed air inside the core, at one of its extremities, or also in different points of its length, by using tubular cores which are suitably punctured or porous. The compressed air could be advantageously applied in such a way as to penetrate between the core and the article, passing through the length in direction A, in order to contribute substantially to the relative movement. An equivalent effect could be obtained by introducing, under the same conditions, in the interface between the core and the article, a liquid agent, whose non-compressibility assures an effect of swelling on the article itself.

The initial detachment between core and article could also be favoured by slight alternative movements of transversal rolling of the article on the transporting surface 20, carried out mechanically for example by making the tape which forms the said surface move in a transversal way, or also vibrations, acting for example on guides, for example rollers, arranged at suitable intervals on both sides of the article lying on the surface 20, means which however assure the support of the article itself, whose great length and whose sensitive flexibility could give rise to movements lateral with respect to its correct straight bearing.

I claim:

1. A method, for the axial separation from a core of uniform diameter on which it has been manufactured and cured, of an elastomeric hose of great length such as at least one hundred meters, which comprises the steps of:
    (i) placing the assembled core and hose on a substantially horizontal non-extensible bearer which is elongated and of at least substantially the same length as the hose, the bearer being such as to have a high coefficient of friction relative to the material of the hose, and
    (ii) effecting relative movement of the core and the hose parallel to a common axis of the core and hose, to an extent sufficient to separate the core and hose totally in the axial direction, such relative movement being obtained by relative movement of said core and bearer with frictional force being applied between said bearer and the hose simultaneously at substantially every point along the length of that part of the hose which at any moment remains on the bearer.

2. The method claimed in claim 1, wherein the core is kept stationary, and the bearer is moved relative to the core.

3. The method claimed in claim 1 wherein the bearer is kept stationary and the core is moved relative to the bearer.

4. The method claimed in claim 1 including the further step of successively applying support means to portions of the core as they become uncovered by relative movement of the hose, such support means being applied at a point adjacent to the exiting of the core from the hose and at such short spacings along the core as substantially to prevent the weight of the uncovered portion of the core being applied to hose covering the remainder of the core.

5. The method claimed in claim 1 including the further step of winding the hose, as it is separated from the core, onto a reel.

6. The method claimed in claim 1 wherein the bearer is of a flexible material, and wherein the bearer is caused to move out of contact with the hose at about the point where the hose leaves the core.

7. The method claimed in claim 6 wherein the bearer is moved in a closed path.

8. The method claimed in claim 6 wherein the bearer, as it separates from the hose, is wound up on a reel.

9. The method claimed in claim 1 wherein the bearer is in a plurality of discrete portions along its length, at least those bearer portions which are in contact with the hose being caused to act in unison.

10. The method claimed in claim 1 including the further step of making lubricating material present between the core and the hose.

11. The method claimed in claim 1 including the further step of making core-detachment material present between the core and the hose.

12. The method claimed in claim 1 including the further step of making fluid at greater than atmospheric pressure present between the core and the hose.

13. The method claimed in claim 1 including the further step of making incompressible liquid present between the core and the hose.

14. The method claimed in claim 1 including the further step of causing the hose to make reciprocal angular movements above the core.

* * * * *